(12) United States Patent
Francisco

(10) Patent No.: US 11,163,614 B1
(45) Date of Patent: Nov. 2, 2021

(54) SYSTEMS AND METHODS FOR MIGRATING VIRTUAL MACHINES TO CONTAINERS

(71) Applicant: Evolute, Inc., Palo Alto, CA (US)

(72) Inventor: Kristopher Francisco, Palo Alto, CA (US)

(*) Notice: Subject to any disclaimer, the term of this patent is extended or adjusted under 35 U.S.C. 154(b) by 149 days.

(21) Appl. No.: 16/773,930

(22) Filed: Jan. 27, 2020

Related U.S. Application Data

(60) Provisional application No. 62/797,200, filed on Jan. 26, 2019.

(51) Int. Cl.
*G06F 9/50* (2006.01)
*G06F 9/455* (2018.01)
*G06F 9/48* (2006.01)

(52) U.S. Cl.
CPC ........ *G06F 9/5088* (2013.01); *G06F 9/45558* (2013.01); *G06F 9/4856* (2013.01); *G06F 2009/4557* (2013.01); *G06F 2009/45575* (2013.01); *G06F 2009/45587* (2013.01)

(58) Field of Classification Search
CPC .. G06F 9/5088; G06F 9/45558; G06F 9/4856; G06F 2009/4557; G06F 2009/45575; G06F 2009/45587
See application file for complete search history.

(56) References Cited

U.S. PATENT DOCUMENTS

2012/0066677 A1* 3/2012 Tang ..................... G06F 9/4856
718/1
2017/0262307 A1* 9/2017 Venkatesh ........... G06F 9/45533

* cited by examiner

*Primary Examiner* — Sisley N Kim

(57) ABSTRACT

Migration from legacy infrastructure (e.g., hypervisor-based virtualization systems utilizing virtual machines (VMs)) to container-based virtualization systems utilizing containers is simplified and accelerated via automation. By utilizing capabilities provided by the Internet Standards Organization (ISO) Open Systems Interconnection model (OSI model) for system standardization, system, application, and data components of VMs can be migrated to containers.

2 Claims, 4 Drawing Sheets

SYSTEMS AND METHODS FOR MIGRATING VIRTUAL MACHINES TO CONTAINERS

CROSS REFERENCE TO RELATED APPLICATIONS

This application claims the benefit under 35 U.S.C. § 119 from U.S. Provisional Patent Application Ser. No. 62/797,200, entitled "Systems And Methods For Migrating Virtual Machines To Containers," filed on Jan. 26, 2019, the subject matter of which is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The subject matter of this disclosure relates in general to the field of virtualization, and more specifically to migrating virtual machine instances to container instances.

BACKGROUND INFORMATION

Server virtualization is a methodology or framework for providing multiple logically isolated execution environments on a single physical server. The physical server is often referred to as the host, and the logical partitions are referred to as guests. Server virtualization enables administrative tasks to be centralized while improving scalability and hardware utilization. There are several forms of server virtualization, such as hypervisor-based virtualization or container-based virtualization. In hypervisor-based virtualization, which is sometimes called hardware virtualization or platform virtualization, the host is the actual machine on which virtualization takes place, and guests are virtual machines (VMs). The software or firmware that instantiates and manages a VM on the host machine is called a hypervisor or a virtual machine monitor (VMM). The hypervisor may interact directly with the physical server's CPU and disk space, and can isolate each virtual machine such that each VM is unaware of other VMs running on the physical machine. The hypervisor can also monitor a physical server's resources. As VMs run applications, the hypervisor may relays resource from the physical machine to the appropriate VM.

In container-based virtualization, also sometimes referred to as operating system-level virtualization, a single operating system kernel can run on a physical machine with several isolated guests called containers installed on top of the shared kernel. With container-based virtualization, the shared operating system kernel can provide process isolation and perform resource management. Thus, although all of the containers run under the same kernel, each container can have its own file system, processes, memory, devices, and other resources.

Container-based virtualization may be preferred over hypervisor-based virtualization in various scenarios due to improved performance. For example, a container-based system may not require an extra layer of abstraction between the operating system and hardware such that native performance or near native performance can be achieved by such a system. Further, because container-based virtualization does not require a complete operating system stack for each guest, a container-based system may require less storage and memory than a hypervisor-based system that runs operating systems entirely separate.

Although there are several benefits to container-based virtualization, enterprises may find it difficult to implement a container-based system. For example, hypervisor-based virtualization may be so entrenched within an enterprise such that switching to container-based systems may require re-architecting and/or rewriting applications for container-based systems. This process is typically manual and can take a lengthy amount of time and come at great costs.

SUMMARY

Migration from legacy infrastructure (e.g., hypervisor-based virtualization systems utilizing virtual machines (VMs)) to container-based virtualization systems utilizing containers is simplified and accelerated via automation. By utilizing capabilities provided by the Internet Standards Organization (ISO) Open Systems Interconnection model (OSI model) for system standardization, system, application, and data components of VMs can be migrated to containers.

In one embodiment, a migration process migrates virtual machine instances to container instances. First, input migration data is received onto a migration system. The migration data is information associated with migrating one or more VM or bare metal application instances to one or more container instances.

Next, an analysis and determination of incoming data file format and metadata associated with a virtual machine image. The analysis and determination are performed by a migration software application. The migration software application is operating at a source or destination system.

Next, one or more VM or bare metal application instances are converted into a universally accessible software and/or disk access standard. This conversion is performed by the migration software application.

Next, a filesystem is mounted and read using the migration software application. This mounting and reading are performed by the migration software application.

Next, raw data blocks are accessed and the source or destination system's metadata and filesystem are mounted. This accessing is performed by the migration software application.

Next, a container is created. The creating of the container is performed by the migration software application.

Next, files are moved to another file system. The moving is performed by the migration software application.

Next, the one or more VM or bare metal application instances are committed or transferred into the container created, and the one or more VM or bare metal application instances are sealed into a container image. The committing or transferring and sealing are performed by the migration software application.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings. The detailed description set forth below is intended as a description of various configurations of example embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Systems and methods in accordance with various embodiments of the present disclosure may overcome one or more of the aforementioned and other deficiencies experienced in conventional approaches for migrating virtual machine (VM) instances to container instances. In particular, various embodiments automate the migration of system, application, and data components of VMs to containers utilizing capabilities provided by the Internet Standards Organization (ISO) Open Systems Interconnection model (OSI model) for system standardization. Thus, the transition from legacy infrastructure (i.e., VMs) to containers can be simplified and accelerated.

Figure 1:
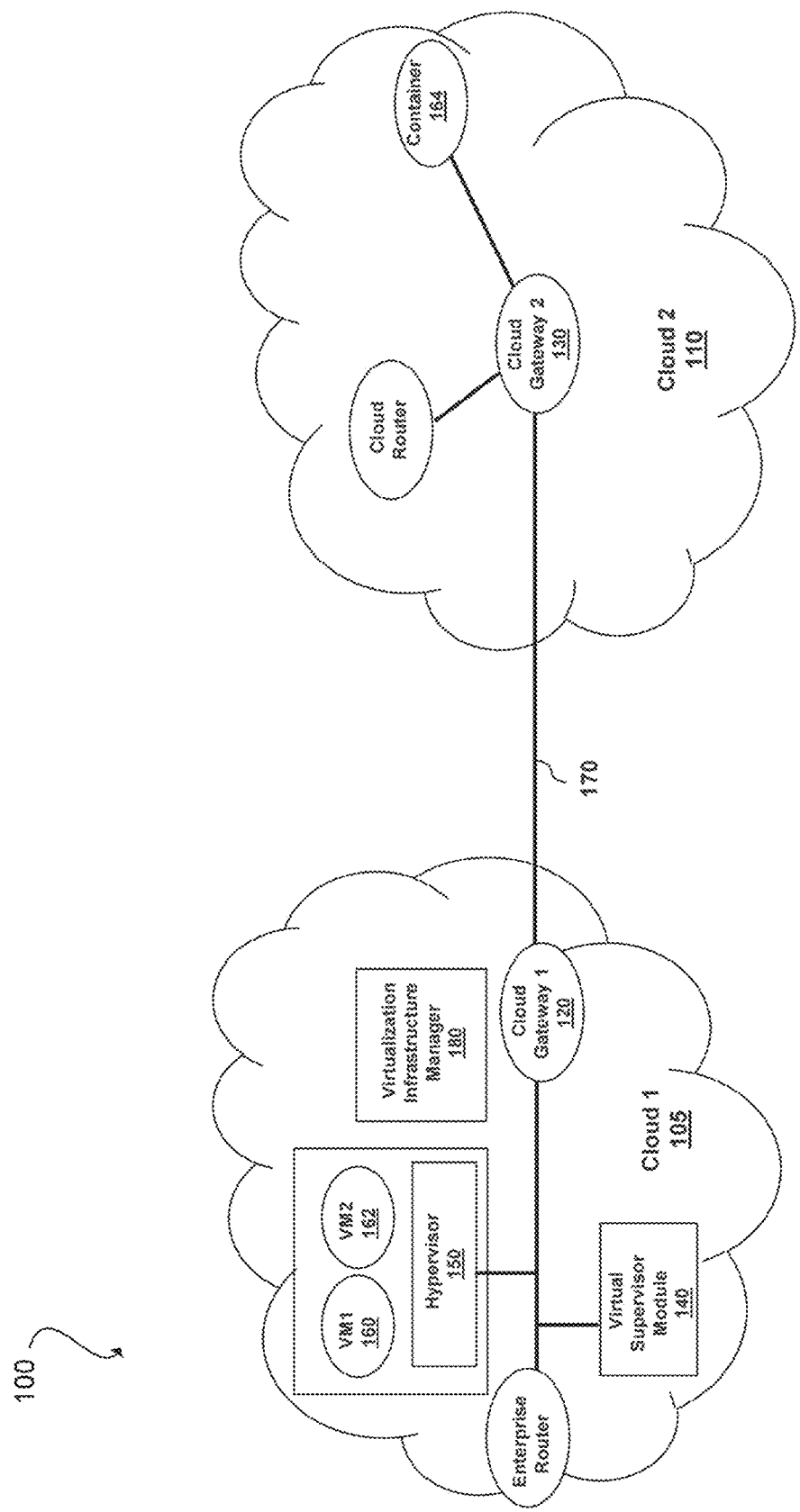
FIG. 1 illustrates an example network environment in which various embodiments can be implemented.

FIG. 1 illustrates an example network environment 100 comprising a plurality of networks or clouds, including first cloud 102 (e.g., an enterprise datacenter) and second cloud 104 (e.g., campus network, public cloud, partner private cloud, etc.) separated by a public network, such as the Internet (not shown). Although network environment 100 is shown to include a pair of physically and/or logically separate networks or clouds, it will be appreciated that other embodiments may utilize a single physical and/or logical network environment or multiple physically and/or logically separate networks or clouds. First cloud 102 and second cloud 104 can be connected via a communication link 120 between first cloud gateway 130 and second cloud gateway 132. Data packets and traffic can be exchanged among the devices of the hybrid cloud network using predefined network communication protocols as will be understood by those skilled in the art.

As depicted in FIG. 1, network environment 100 includes migration system 140. Migration system 140 can serve as a management interface for converting VMs 152 and 154 in first cloud 102 to containers 162 and 164 in second cloud 104. In some embodiments, migration system 140 can retrieve VM-specific network policies (e.g., port profiles) to configure network policies for containers 162 and 164. In some embodiments, migration system 140 can retrieve VM-specific application configuration data to configure applications running on containers 162 and 164.

FIG. 1 also illustrates hypervisor 150 (also sometimes referred to as a virtual machine manager or a virtual machine monitor (VMM)) in first cloud 102. Hypervisor 150 may be computer software or firmware hardware that creates and runs one or more VMs, such as VMs 152 and 154. Each VM can host a private application. Hypervisor 150 can be controlled by virtualization platform 170, and can provide a respective operating system to one or more VMs.

FIG. 1 also illustrates shared kernel 160 in second cloud 104. Shared kernel 160 can be computer software or firmware for providing operating system functionalities to containers 162 and 164. Common binaries and libraries can be shared on the same physical machine, which enables a container-based virtualization system to serve a greater number of guests than a hypervisor-based virtualization system.

FIG. 1 also illustrates virtual platform 170 within first cloud 102. Virtualization platform 170 can be a management plane system for auto-provisioning resources within network environment 100. Virtualization platform 170, in this example, is a management platform running in first cloud 102, and can be generally responsible for providing cloud operations, translating between private cloud and public cloud interfaces, managing cloud resources, instantiating cloud gateways and cloud VMs and containers though private virtualization platform and public cloud provider application programming interfaces (APIs). Virtualization platform 170 may also monitor the health of all of the components of network environment 100 (e.g., cloud gateways, VMs, containers, and communication link 120), and ensure high availability of those components.

As discussed above, FIG. 1 also illustrates communication link 120. Communication link 120 can take several forms, such as various types of virtual private networks (VPNs) or Layer 2 (or "L2" of the Open Systems Interconnection model (OSI model)) tunneling protocols. For example, some embodiments utilize an open VPN (e.g., OpenVPN) overlay or an IP security (IPSec) VPN based L3 network extension to provide communication link 120. Some embodiments utilize a secure transport layer (i.e., Layer 4 or "L4" of the OSI model) tunnel as communication link 120 between first cloud gateway 130 and second cloud gateway 132, where the secure transport layer tunnel is configured to provide a link layer (i.e., Layer 2 or "L2") network extension between first cloud 102 and second cloud 104. By establishing a secure transport layer (i.e., L4) tunnel (e.g., transport layer security (TLS), datagram TLS (DTLS), secure socket layer (SSL), etc.) over the public network, a secure L2 switch overlay can be built that interconnects second cloud resources with first clouds (e.g., enterprise network backbones). In other words, communication link 120 provides a link layer network extension between first cloud 102 and second cloud 104.

As noted, first cloud gateway 130 can use an L4 Secure Tunnel to connect to the cloud resources allocated in second cloud 104. The L4 secure tunnel may be well-suited for use with corporate firewalls and Network Address Translation (NAT) devices due to the nature of the transport level protocols (e.g., UDP/TCP) and the transport layer ports opened for HTTP/HTTPS in the firewall. The L2 network can thus be further extended and connected to each cloud VM (e.g., VMs 152 and 154) and container (e.g., containers 162 and 164) through second cloud gateway 132. With an L2 network overlay, instances of a particular application can be seamlessly migrated to the overlay network dynamically created in second cloud 104, without any impact to existing corporate infrastructure.

Figure 2:
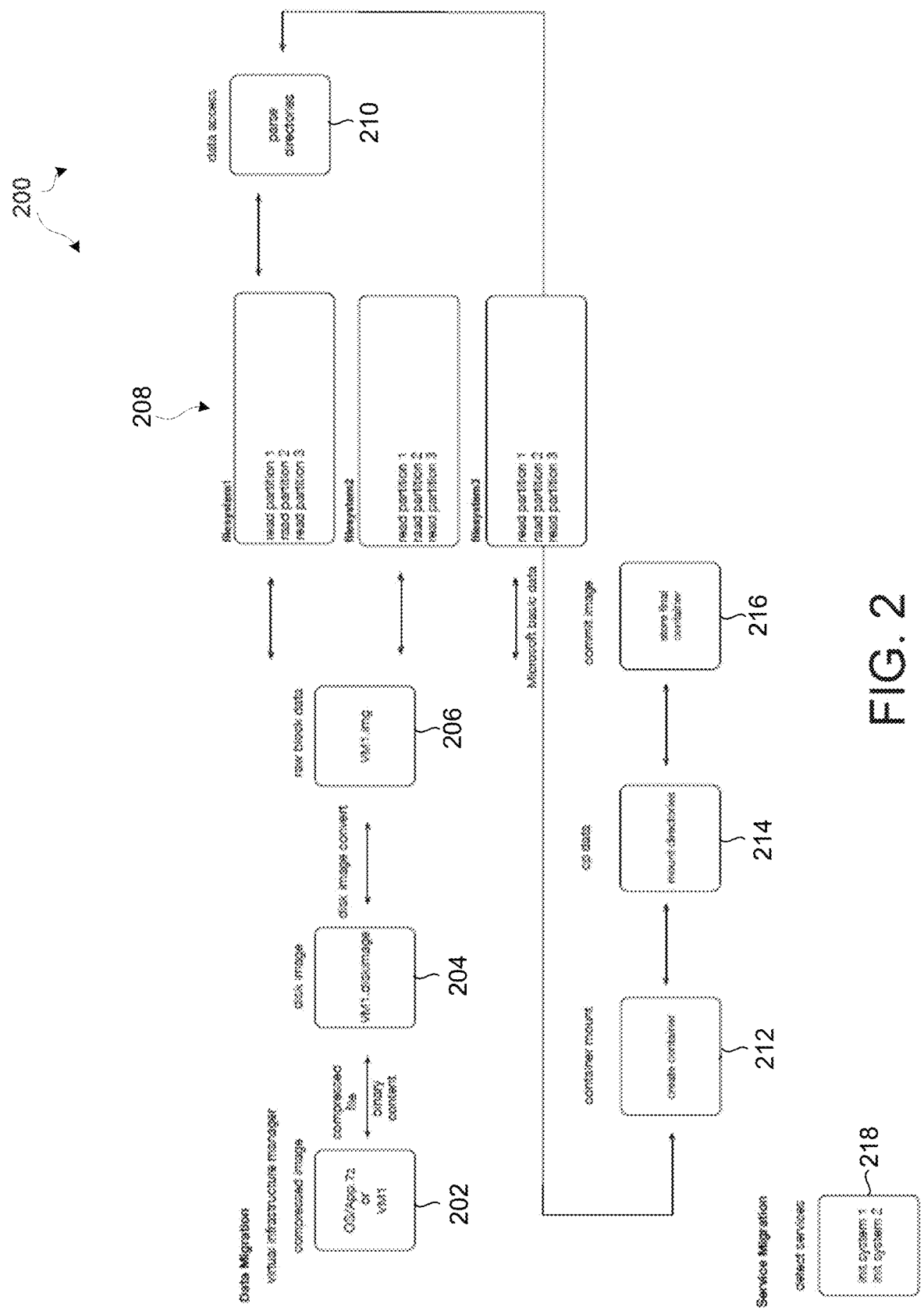
FIG. 2 illustrates an example process for migrating virtual machine instances to container instances in accordance with an embodiment.

FIG. 2 illustrates an example process 200 for migrating virtual machine instances to container instances in accordance with an embodiment. Migration process 200 can include a series of steps. It should be understood that, for any process discussed herein, there can be additional, fewer, or alternative steps performed in similar or alternative orders, or in parallel, within the scope of the various embodiments unless otherwise stated. Migration process 200 can begin at step 202 in which a migration system, such as migration system 140 of FIG. 1, can receive input data for migrating one or more virtual machine instances to one or more container instances. In one embodiment, the migration system can access a virtualization platform or hypervisor manager (e.g., vSphere® from VMware®, Inc. of Palo Alto, Calif., Hyper-V® from Microsoft® Corp. of Seattle, Wash., XenServer® from Citrix® Systems, Inc. of Santa Clara, Calif., or Red Hat® Enterprise Virtualization from Red Hat®, Inc. of Raleigh, N.C.), and request one or more virtual machine images from the virtualization platform. In another embodiment, a user can provide one or more virtual machine disk images as input to the migration system.

The input data received to the migration system can include non-transitory storage (e.g., disk). In some embodiments, the input data can also include short-term storage (e.g., memory). Those embodiments that only receive non-transitory storage as input may be referred to as "interruptive," while those that receive non-transitory storage and short-term storage may be referred to as "non-interruptive." Steps for non-interruptive memory transfer are well known to those of ordinary skill in the art, and will not be described in detail herein.

Migration process 200 may continue with step 204 in which the migration system analyzes and determines the incoming data file format and other metadata associated with the virtual machine disk image. Virtual machine images can come in many forms. Two categories of input are binary and compressed. The latter can be generated from an encapsulation mechanism to reduce transfer size and time. In those embodiments in which the migration system receives a compressed image as input, the migration system may also perform a de-encapsulation/decompression process to get to the binary image. Once a de-encapsulated/decompressed virtual machine disk image is obtained, the migration system may determine the virtual machine disk image's format. There are a variety of virtual machine image formats, such as Open Virtualization Format (OVF) or Virtual Machine Disk (VMDK) from VMware®, Amazon Machine Images (AMI) from Amazon® of Seattle, Wash., QEMU Copy On Write (QCOW) from Quick Emulator (QEMU®), among others. For example, in an embodiment in which the migration system receives an OVF file, the migration system can identify the aforementioned file format, such as by reviewing the extension and analyzing the contents via a disk read, for example:

% cat test.vmdk
Disk DescriptorFile
version=1
CID=ffffffe
parentCID=ffffff
createType="twoGbMaxExtentSparse"
Extent description
RW 4192256 SPARSE "test-s001.vmdk"
RW 4192256 SPARSE "test-s002.vmdk"
RW 2101248 SPARSE "test-s003.vmdk"

The Disk Data Base
DDB
ddb.adapterType="ide"
ddb.geometry.sectors="63"
ddb.geometry.heads="16"
ddb.geometry.cylinders="10402"

In this example, the migration system can parse the virtual machine metadata to obtain information about the running system (e.g., Virtual Machine Name, Operating System, Processor Type, Expected CPU Allocation, Expected Memory Allocation, Network Settings, etc.), for example:

Virtual Machine Name—evolute001
Operating System—Linux
Processor Type—x86
Expected CPU Allocation—2
Expected Memory Allocation—1024 MBs
Network Type—10 GB Ethernet In some embodiments, defaults can be utilized if the configuration data cannot otherwise be gathered from the virtual machine disk image.

After the migration system determines the virtual machine image format and other metadata, migration process 200 may proceed to step 206 in which the migration system converts the virtual machine image into a universally accessible disk access standard, such as RAW disk blocks. In various embodiments, the migration system can utilize the built-in raw device file reader of the virtual disk image's operating system (e.g., MacOS® from Apple®, Inc. of Cupertino, Calif., Windows® from Microsoft, LINUX®, among others) to read the blocks.

In an embodiment in which the virtual disk image's operating system is LINUX®, raw data can be read in two modes, such as by setting raw device bindings or by querying existing bindings. When setting a raw device, /dev/raw/raw<N> is the device name of an existing raw device node in the file system. The block device to which it is to be bound can be specified either in terms of its major and minor device numbers, or as a path name, e.g., /dev/<blockdev>, to an existing block device file. In an embodiment in which the virtual disk image's operating system is Windows®, the migration system can leverage built-in system discovery to mount and parse the raw device data.

Once the migration system obtains the raw block data, migration process 200 can continue to step 208 in which the migration system mounts and reads the file system. This step can include determining the file system type, such as ext2, ext3, ext4, xfs/LVM, and zfs, among others. The migration system can utilize the built-in identification capabilities of the virtual machine image's operating system to identify the partition type. Once the partition is determined, the migration system can rescan disk via the operating system (e.g., 'vgscan'), rescan available partitions (e.g. 'vgchange'), and validate new file systems that have been identified.

After the file system is identified, migration process 200 can proceed to step 210 in which the migration system accesses the raw data blocks and mounts the container's filesystem. The migration system can leverage the built-in mount command of the container's operating system to make the container disk accessible for reading (i.e., mounting the container disk). This step enables the migration system to read the disk's data (e.g., file1.txt, file2.jpg, file3.cfg, etc.).

Upon validating that the raw data can be read, migration process 200 continues to step 212 in which the migration system prepares the new storage for the container. The migration system can create a new container thus creating a new storage subsystem for the container. The migration system mounts this disk on the file system (e.g., /mnt/evolute/lxc-disk1/disk) for data writing. This allows the migration system to move the data from the virtual machine disk to the container disk.

After the user's readable data is accessible, migration process 200 can proceed to step 214 in which the migration system can move files to another file system, such as via OSI Model Layer 6. For example, by accessing /home/user/image.jpg, the migration system can copy and move that file to the container image. In this step, all file systems may be analyzed for usefulness of migration. For instance, the /tmp directory (a temporary directory meant to be used for unimportant data) may not be copied while all contents of /home may be copied. The migration system may also read more detailed information from the files system, such as the distribution (e.g., LINUX® 3.10 or Windows® 8.1) and kernel parameters previously used. At the end of this step, critical user and system data will have been transferred to the new system.

Migration process 200 continues to step 216 in which the migration system seals the new container, such as by performing an 'lxc-commit' to ensure the data is kept with the newly created image. It will be appreciated that this step is specific to LINUX® containers. Other embodiments may perform equivalent processes for other types of containers as would be known to those of ordinary skill.

After the new container image is provisioned, migration process 200 can proceed to step 218 to launch the image with proper settings on the proper system. As determined in steps 204 and step 214, information regarding the virtual machine's operating system, processor type, kernel version, network configuration and other known variables enable the migration system to recommend and/or execute migration on the correct platform. Additionally or alternatively, users may opt to power down the virtual machine and continue executing with the newly created container.

Figure 3A:
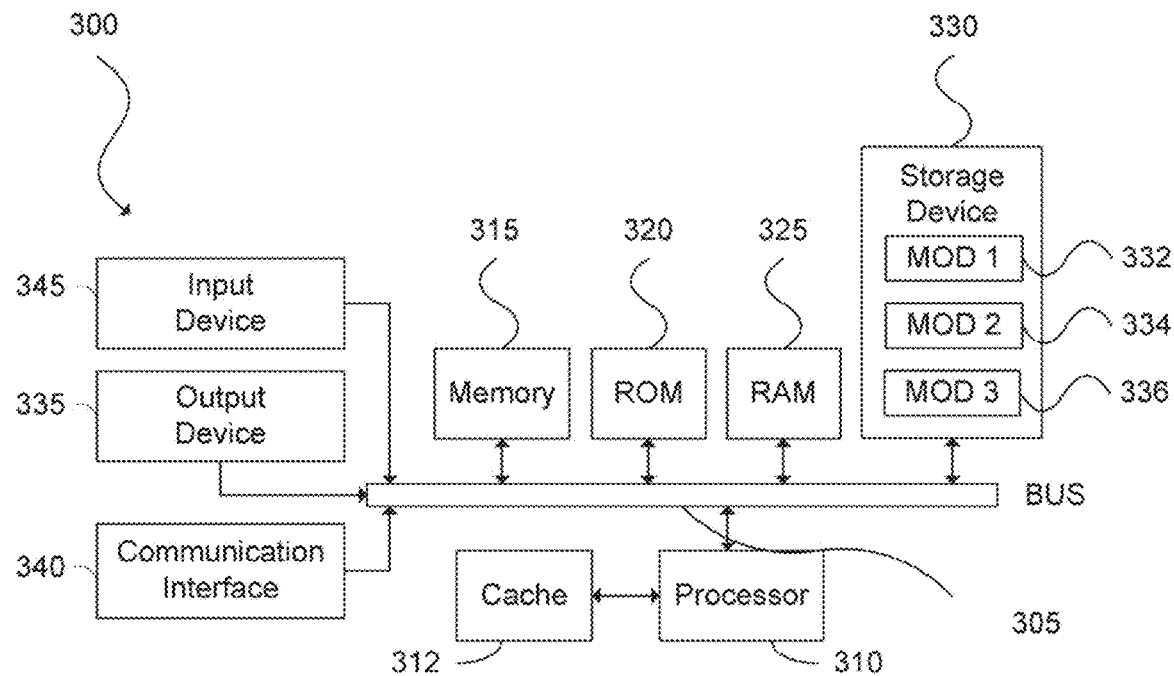
FIGS. 3A and 3B illustrate example systems that can be utilized in various embodiments.
Figure 3B:
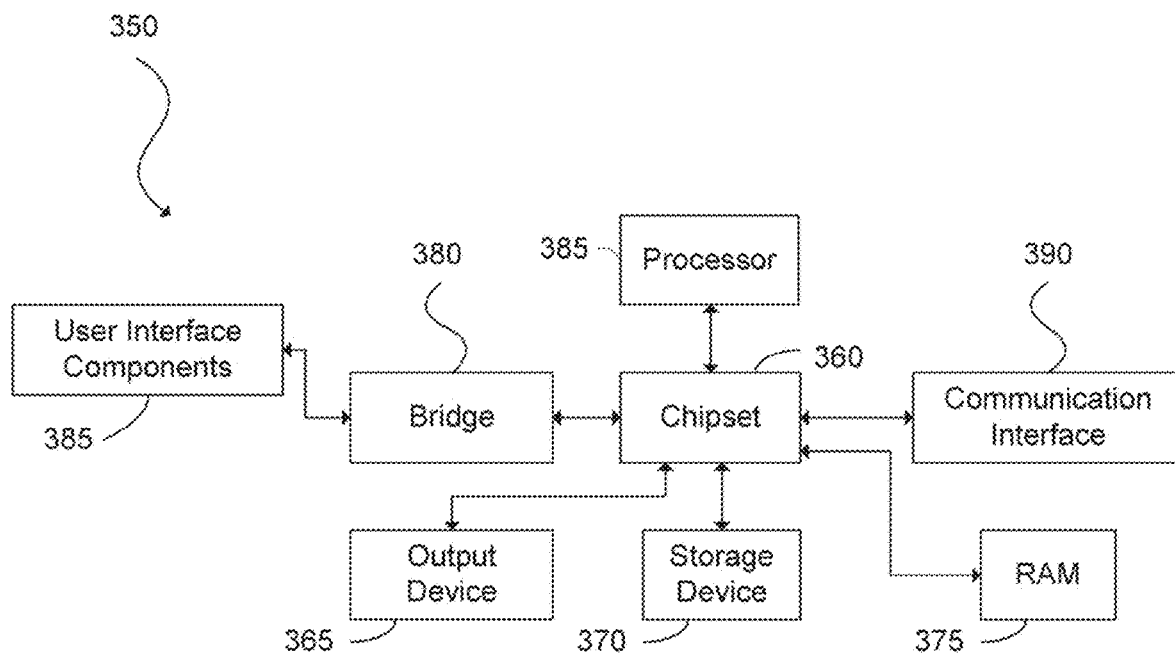

FIG. 3A and FIG. 3B illustrate example systems that can be utilized in various embodiments. The more appropriate embodiment will be apparent to those of ordinary skill in the art when practicing the present technology. Persons of ordinary skill in the art will also readily appreciate that other system embodiments are possible.

FIG. 3A illustrates an architecture for conventional bus computing system 300 wherein the components of the system are in electrical communication with each other using bus 305. Exemplary system 300 includes processing unit (CPU or processor) 310 and system bus 305 that couples various system components including system memory 315, such as read only memory (ROM) 320 and random access memory (RAM) 325, to processor 310. Bus computing system 300 can include a cache of high-speed memory connected directly with, in close proximity to, or integrated as part of the processor 310. Bus computing system 300 can copy data from memory 315 and/or storage device 330 to cache 312 for quick access by processor 310. In this way, cache 312 can provide a performance boost that avoids processor 310 delays while waiting for data. These and other modules can control processor 310 to perform various actions. Other system memory 315 may be available for use as well. Memory 315 can include multiple different types of memory with different performance characteristics. Processor 310 can include any general purpose processor and a hardware module or software module, such as module 1 332, module 2 334, and module 3 336 stored in storage device 330, to control processor 310 as well as a special-purpose processor where software instructions are incorporated into the actual processor design. Processor 310 may essentially be a completely self-contained computing system, containing multiple cores or processors, a bus, memory controller, cache, etc. A multi-core processor may be symmetric or asymmetric.

To enable user interaction with bus computing system 300, input device 345 can represent any number of input mechanisms, such as a microphone for speech, a touch-sensitive screen for gesture or graphical input, keyboard, mouse, motion input, speech and so forth. Output device 335 can also be one or more of a number of output mechanisms known to those of skill in the art. In some instances, multimodal systems can enable a user to provide multiple types of input to communicate with bus computing system 300. Communications interface 340 can generally govern and manage the user input and system output. There is no restriction on operating on any particular hardware arrangement and therefore the basic features here may easily be substituted for improved hardware or firmware arrangements as they are developed.

Storage device 330 can be a non-volatile memory that can be implemented as a hard disk or other types of computer readable media which can store data that are accessible by a computer, such as magnetic cassettes, flash memory cards, solid state memory devices, digital versatile disks, cartridges, random access memories (RAMS) 325, read only memory (ROM) 320, and hybrids thereof.

As discussed, storage device 330 can include software modules 332, 334, 336 for controlling processor 310. Other hardware or software modules are contemplated. Storage device 330 can be connected to system bus 305. In one aspect, a hardware module that performs a particular function can include the software component stored in a computer-readable medium in connection with the necessary hardware components, such as processor 310, bus 305, output device 335, and so forth, to carry out the function.

FIG. 3B illustrates an architecture for a chipset computing system 350 that can be used in executing the described methods and generating and displaying a graphical user interface (GUI). Computing system 350 is an example of computer hardware, software, and firmware that can be used to implement the disclosed technology. Computing system 350 can include processor 355, representative of any number of physically and/or logically distinct resources capable of executing software, firmware, and hardware to perform identified computations. Processor 355 can communicate with chipset 360 that can control input to and output from processor 355. In this example, chipset 360 outputs information to output 365, such as a display, and can read and write information to storage device 370, which can include magnetic media, and solid state media, for example. Chipset 360 can also read data from and write data to RAM 375. Bridge 380 for interfacing with a variety of user interface components 385 can be provided for interfacing with chipset 360. Such user interface components 385 can include a keyboard, a microphone, touch detection and processing circuitry, a pointing device, such as a mouse, and so on. In general, inputs to computing system 350 can come from any of a variety of sources, machine generated and/or human generated.

Chipset 360 can also interface with one or more communication interfaces 390 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 355 analyzing data stored in storage device 370 or RAM 375. Further, the machine can receive inputs from a user via user interface components 385 and execute appropriate functions, such as browsing functions by interpreting these inputs using processor 355.

It can be appreciated that exemplary computing systems 300 and 350 can have more than one processor or be part of a group or cluster of computing devices networked together to provide greater processing capability.

Figure 4:
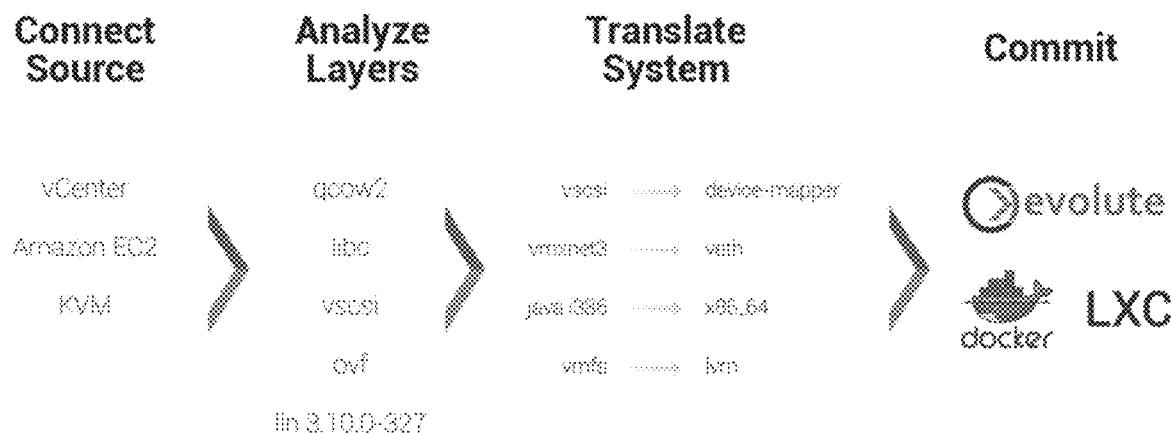
FIG. 4 illustrates a method of containerizing a software application in accordance with one novel aspect.

FIG. 4 illustrates a method of containerizing a software application in accordance with one novel aspect. In this example, a high-level process flow shows how the novel system containerizes software applications. In a first step, connect source functionality is performed. Software applications that are to be containerized are typically stored in one of several storage mechanisms. These source locations are identified, and connections are configured between the novel system and each of the source locations. In a second step, analysis of application layers is performed for each software application to be containerized. The analysis involves identifying various protocols associated with the source software applications. In a third step, a system translation process is performed. In the system translation process, a map is created between protocols used in the source software applications and protocols used in the destination system. In a fourth step, a commit process is performed. During the commit process, the software application is containerized in the destination system.

Figure 5:
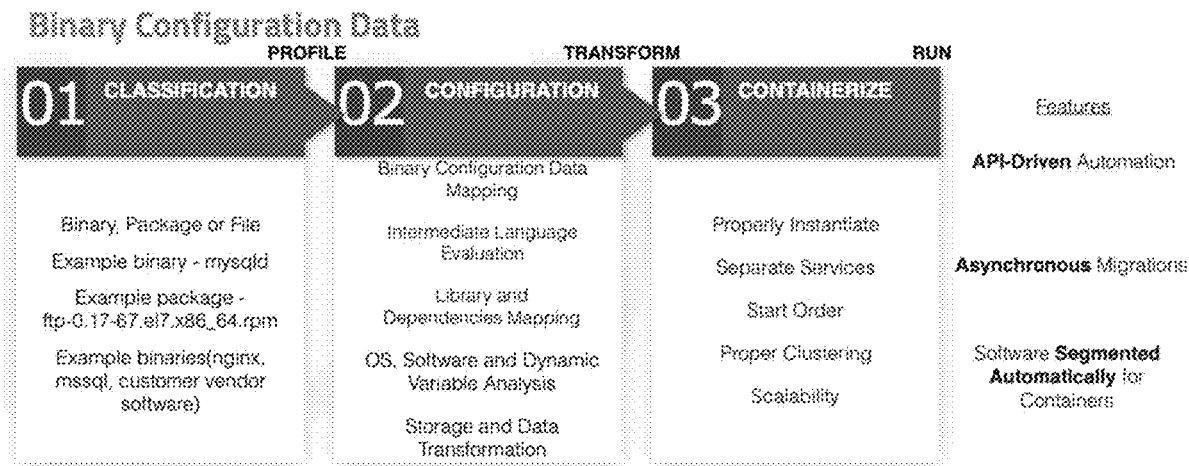
FIG. 5 is another method of containerizing a software application in accordance with another novel aspect.

FIG. 5 is another method of containerizing a software application in accordance with another novel aspect. In a first step, a classification is performed. During the classification step, a binary application, a software package, or an existing file of a software application are analyzed to understand their relationships between the software application's components. In a second step, a configuration process is performed. During the configuration process, software is separated from its local configuration. For example, a compiled application is analyzed to see how it is relating its configuration. In a third step, the separated components are reconfigured to exist natively in a container. The related software components including how to run the software application, how to run interdependent components of the software applications, and how to run all components as a set of cluster applications is created. The resulting output is the containerized application or a microservice.

For clarity of explanation, in some instances the present technology may be presented as including individual functional blocks representing devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Accordingly, various modifications, adaptations, and combinations of various features of the described embodiments can be practiced without departing from the scope of the invention as set forth in the claims.

What is claimed is:

1. A method comprising:
   receiving input migration data onto a migration system, wherein the migration data is information associated with migrating one or more VM or bare metal application instances to one or more container instances;
   analyzing and determining incoming data file format and metadata associated with a virtual machine image, wherein the analyzing and determining are performed by the migration software application at source or destination system;
   converting the one or more VM or bare metal application instances into a universally accessible software and/or disk access standard, wherein the converting is performed by the migration software application;

mounting and reading a filesystem using the migration software application, wherein the mounting and reading are performed by the migration software application;

accessing raw data blocks and mounting the source or destination system's metadata and filesystem, wherein the accessing is performed by the migration software application;

creating a container, wherein the creating is performed by the migration software application;

moving files to another file system, wherein the moving is performed by the migration software application; and committing or transferring the one or more VM or bare metal application instances into the created container and sealing the one or more VM or bare metal application instances into a container image, wherein the committing or transferring and sealing are performed by the migration software application.

2. The method of claim 1, further comprising:

launching at least one of the VM or bare metal application instances with appropriate settings and on an appropriate system as determined by the migration system.

\* \* \* \* \*